|                                      |                |
| ------------------------------------ | ---------------------------------- |
| (12) United States Patent        | (10) Patent No.: US 11,921,483 B2 |
| Reichl et al.                        | (45) Date of Patent: *Mar. 5, 2024 |

(54) BUILDING MANAGEMENT SYSTEM WITH INSTANT FEEDBACK ON CONFIGURATION

(71) Applicant: Johnson Controls Tyco IP Holdings LLP, Milwaukee, WI (US)

(72) Inventors: Gregory T. Reichl, Kaukauna, WI (US); Jason T. Sawyer, Greendale, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,301

(22) Filed: Jan. 12, 2023

(65) Prior Publication Data

US 2023/0152770 A1 May 18, 2023

Related U.S. Application Data

(63) Continuation of application No. 16/261,472, filed on Jan. 29, 2019, now Pat. No. 11,561,521.

(60) Provisional application No. 62/623,654, filed on Jan. 30, 2018.

(51) Int. Cl.
  *G05B 19/042* (2006.01)
  *F24F 11/48* (2018.01)
  *F24F 11/52* (2018.01)
  *F24F 11/64* (2018.01)
  *F24F 3/00* (2006.01)

(52) U.S. Cl.
  CPC ............ *G05B 19/042* (2013.01); *F24F 11/48* (2018.01); *F24F 11/52* (2018.01); *F24F 11/64* (2018.01); *F24F 3/001* (2013.01); *G05B 2219/23258* (2013.01); *G05B 2219/25011* (2013.01); *G05B 2219/2614* (2013.01)

(58) Field of Classification Search
  CPC ........ G05B 19/042; G05B 2219/23258; G05B 2219/25011; G05B 2219/2614; G05B 15/02; F24F 11/64; F24F 11/48; F24F 11/52; F24F 3/001
  USPC ........................................................ 700/276
  See application file for complete search history.

(56) References Cited

U.S. PATENT DOCUMENTS

| 5,812,394 A      | 9/1998  | Lewis et al.     |
| 2011/0055748 A1  | 3/2011  | Vacariuc         |
| 2011/0153524 A1  | 6/2011  | Schnackel        |
| 2012/0143378 A1  | 6/2012  | Spears et al.    |
| 2012/0322358 A1  | 12/2012 | Wendorski et al. |
| 2013/0006395 A1  | 1/2013  | Plache et al.    |
| 2014/0039685 A1  | 2/2014  | Blount et al.    |
| 2014/0156087 A1  | 6/2014  | Amundson         |

(Continued)

*Primary Examiner* — Jigneshkumar C Patel
(74) *Attorney, Agent, or Firm* — Foley & Lardner LLP

(57) ABSTRACT

A building management system (BMS) provides feedback to a user via a user interface to assist the user in configuring the BMS. It can be challenging for new or less experienced users to understand all of the actions they are performing when configuring a BMS. The feedback presented via the user interface includes graphical and textual feedback to alert the user of actions performed when applying tags. The feedback identifies one or more missing requirements associated with the tags. The feedback presented via the user interface also includes textual summaries of control sequences configured using the BMS. The textual summaries include descriptions of control sequences and instructions for properly configuring the building equipment.

20 Claims, 12 Drawing Sheets

(56) References Cited

U.S. PATENT DOCUMENTS

2015/0241856 A1 8/2015 Walser et al.
2018/0011455 A1 1/2018 Camarasa et al.

| | | |
|---|---|---|
| UI IN1 | AHU23-DA-T | DISCHARGE AIR TEMPERATURE |
| UI IN2 | AHU23-DA1-P | DISCHARGE AIR STATIC PRESSURE 1 |
| UI IN3 | AHU23-FFILT-S | FINAL FILTER STATUS |
| UI IN4 | AHU23-LT-A | LOW TEMPERATURE ALARM |
| UI IN5 | AHU23-PH-T | PREHEAT TEMPERATURE |
| UI IN6 | AHU23-SF-S | SUPPLY FAN STATUS |
| UO OUT1 | AHU23-SF-C | SUPPLY FAN COMMAND |
| UO OUT2 | AHU23-SF-O | SUPPLY FAN OUTPUT |
| UO OUT3 | AHU23-MAD-O | MIXED AIR DAMPER OUTPUT |
| UO OUT4 | AHU23-PH-O | PREHEAT OUTPUT |
| UO OUT5 | AHU23-CLG-O | COOLING OUTPUT |

800 ⟶, 802 ⟶ UO OUT3

850 ⟶

OBJECT
| | |
|---|---|
| NAME | MAD-O |
| DESCRIPTION | MIXED AIR DAMPER OUTPUT |

HARDWARE SETUP
| | |
|---|---|
| MIN OUT VALUE | 0.00% |
| MAX OUT VALUE | 100% |
| DEADBAND | 0.00% |

HARDWARE
| | |
|---|---|
| DEVICE TYPE | M9220HGC-0 |

ENGINEERING VALUES
| | |
|---|---|
| MIN VALUE | 0.00% |
| MAX VALUE | 100% |

TAGS ⟶ 852
| | |
|---|---|
| ISOUTPUTOF | AHU23 |
| HASPART | VOPBB-050X036 |
| | VOPBB-078X024 |
| | VOPBB-050X036 |
| ISCONTROLLEDBY | PROPORTIONAL OA DAMPER CONTROL v50 |

FIG. 8

| WARNINGS | PART NUMBERS | RELATIONSHIPS | META DATA |
|---|---|---|---|
| CONNECTION MISSING BETWEEN AHU23-DA1-P AND START STOP SEQUENCING DA-T | | | 902 |
| RF-C AND 10 OTHER POINTS ARE MISSING TAG INFORMATION | | | 904 |
| EQUIPMENT TYPE AND SERVING RELATIONSHIP(S) NOT DEFINED | | | 906 |

Fans

Supply Fan

SUPPLY FAN SPEED CONTROL: THE SUPPLY FAN CONTROL IS TO MAINTAIN A MINIMUM STATIC PRESSURE IN THE SUPPLY DUCTWORK TO ENSURE PROPER TERMINAL AIR BOX OPERATION. INSTALL A STATIC PRESSURE SENSING PROBE IN THE MAIN SUPPLY DUCT LOCATED AT APPROXIMATELY % OF THE WAY DOWN THE MAIN SUPPLY DUCT AS SHOWN ON THE PLANS AND PIPE TO THE DIFFERENTIAL PRESSURE TRANSMITTER THAT SHALL BE LOCATED IN THE UNIT TEMPERATURE CONTROL PANEL. THE INPUTS TO THE DIFFERENTIAL PRESSURE TRANSMITTER SHALL BE THE STATIC PRESSURE INSIDE OF THE DUCT AND THE REFERENCE INPUT SHALL SENSE THE ACTUAL SPACE SERVED BY THE AIR SYSTEM LOCATED IN THE CEILING BELOW THE DUCT PROBE. THE DDC SYSTEM SHALL MODULATE THE SUPPLY FAN VFD TO MAINTAIN THE STATIC PRESSURE SETPOINT AS SENSED BY THE STATIC PRESSURE SENSOR. STATIC PRESSURE SETPOINT SHALL BE 1.0" W.C. (ADJ). WORK WITH BALANCING CONTRACTOR TO MEASURE AND RECORD REQUIRED PRESSURE FOR MOST REMOTE VAV BOX TO MAINTAIN FULL OPEN. A HIGH LIMIT STATIC PRESSURE SENSOR WITH MANUAL RESET SHALL PREVENT THE SUPPLY FAN FROM DEVELOPING OVER 3.0"WC AT THE DISCHARGE.

FIG. 10

BUILDING MANAGEMENT SYSTEM WITH INSTANT FEEDBACK ON CONFIGURATION

CROSS-REFERENCE TO RELATED PATENT APPLICATION

This application is a continuation of U.S. patent application Ser. No. 16/261,472 filed Jan. 29, 2019, which claims the benefit of and priority to U.S. Provisional Patent Application No. 62/623,654 filed Jan. 30, 2018, the entire disclosures of both of which are incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

Building management systems can be difficult to properly configure for new or inexperienced users. Even for more experienced users, the process of configuring a BMS for a large site can be very time consuming and a variety of mistakes can be made. It would be desirous to have a BMS that can assist users during the configuration process.

SUMMARY

One implementation of the present disclosure is a method for configuring and operating building equipment in a BMS. The method includes receiving a first input from the user via a user interface, the input comprising an application of a tag within the BMS, the tag associated with the building equipment; presenting an equipment graphic on the user interface in accordance with the application of the tag; identifying a missing requirement associated with the first input; presenting feedback to the user on the user interface that identifies the missing requirement; receiving a second input from the user via the user interface, the second input satisfying the missing requirement; receiving a third input from the user via the user interface, the third input comprising a control decision associated with the building equipment; and providing a control signal to the building equipment in accordance with the control decision.

Another implementation of the present disclosure is another method for configuring and operating building equipment in a BMS. The method includes receiving a first input from the user via a user interface, the first input comprising a control sequence associated with the building equipment; presenting a textual summary to the user via the user interface, the textual summary comprising a description of the control sequence and an instruction for properly configuring the building equipment; receiving a second input from the user via the user interface, the second input comprising a confirmation of the control sequence; and providing a control signal to the building equipment in accordance with the control sequence.

BRIEF DESCRIPTION OF THE DRAWINGS

FIG. 8 is an illustration of two example interfaces showing data points associated with the BMS of FIG. 4 that can be generated by the GUI generator of FIG. 5, according to some embodiments.

FIG. 9 is an illustration showing an example of feedback that can be generated by the GUI generator of FIG. 5 to assist a user in configuring the BMS of FIG. 4, according to some embodiments.

FIG. 10 is an illustration showing another example of feedback that can be generated by the GUI generator of FIG. 5 to assist a user in configuring the BMS of FIG. 4, according to some embodiments.

DETAILED DESCRIPTION

Overview

Referring generally to the FIGURES, systems and methods for providing feedback on configuration of a building management system (BMS) are shown, according to various exemplary embodiments. A common data model is implemented in a BMS in order to analyze and define data requirements needed to support various business processes. The BMS is configured to provide a user interface for commissioning, maintaining, and otherwise managing data associated with a BMS. The BMS generates warnings, alerts, or other visual feedback in response to inputs received from users. The feedback presented via the user interface assists the user in applying tags and properly configuring control logic within the BMS>

Building Management System and HVAC System

Figure 1:
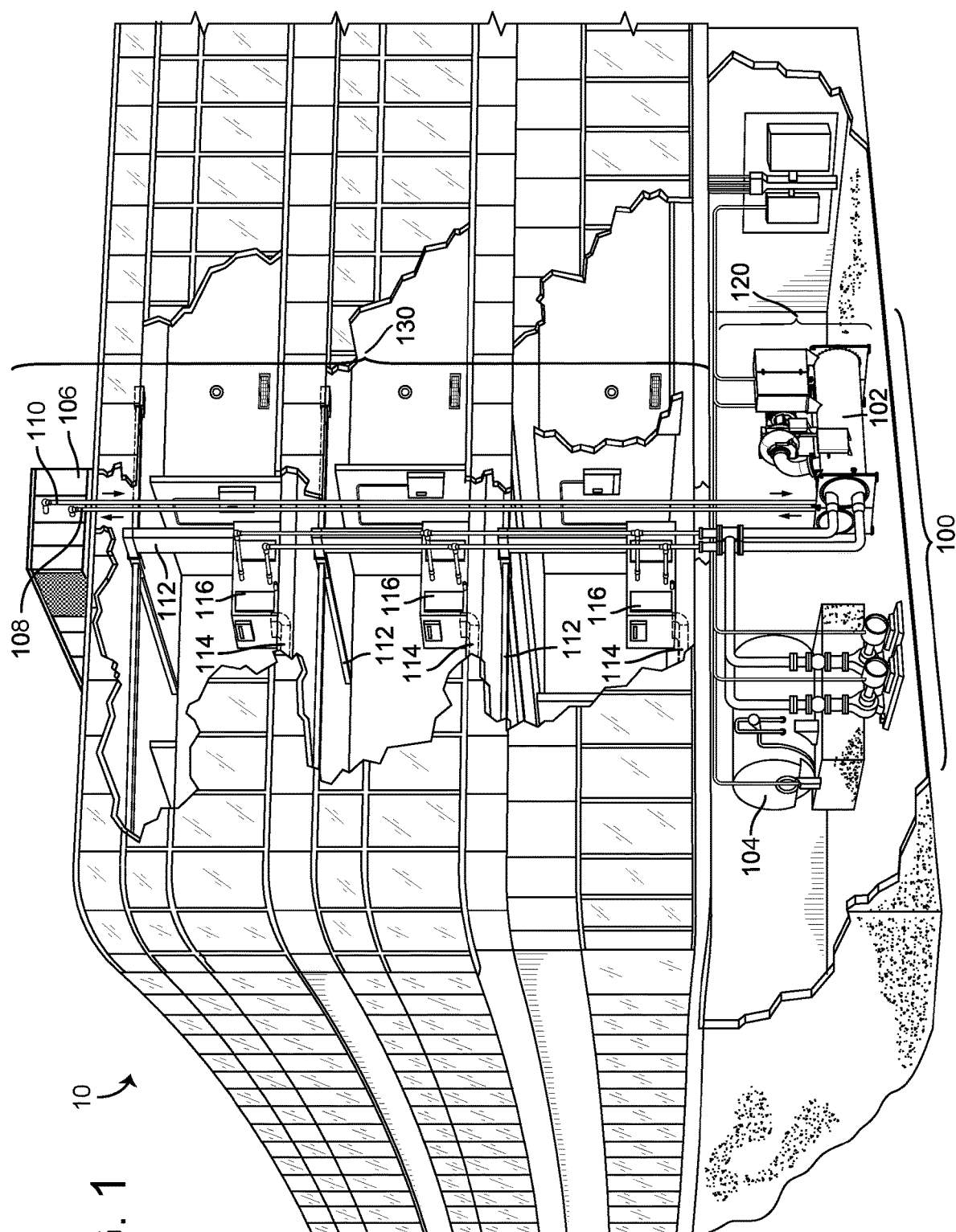
FIG. 1 is a drawing of a building equipped with a building management system (BMS) and a HVAC system, according to some embodiments.

Referring now to FIGS. 1-4, an example building management system (BMS) and HVAC system in which the systems and methods of the present disclosure can be implemented are shown, according to an example embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
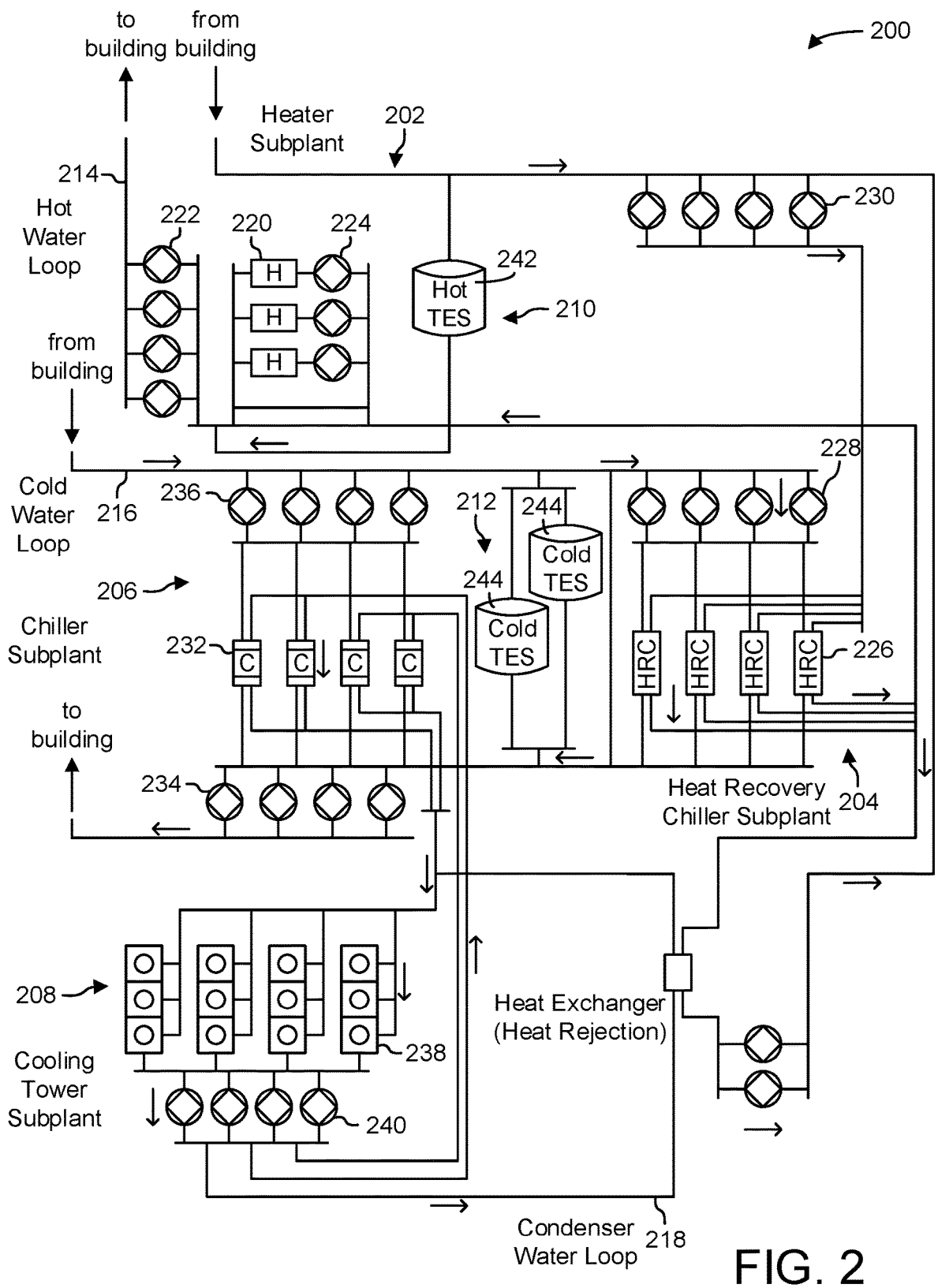
FIG. 2 is a schematic of a waterside system which can be used as part of the HVAC system of FIG. 1, according to some embodiments.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
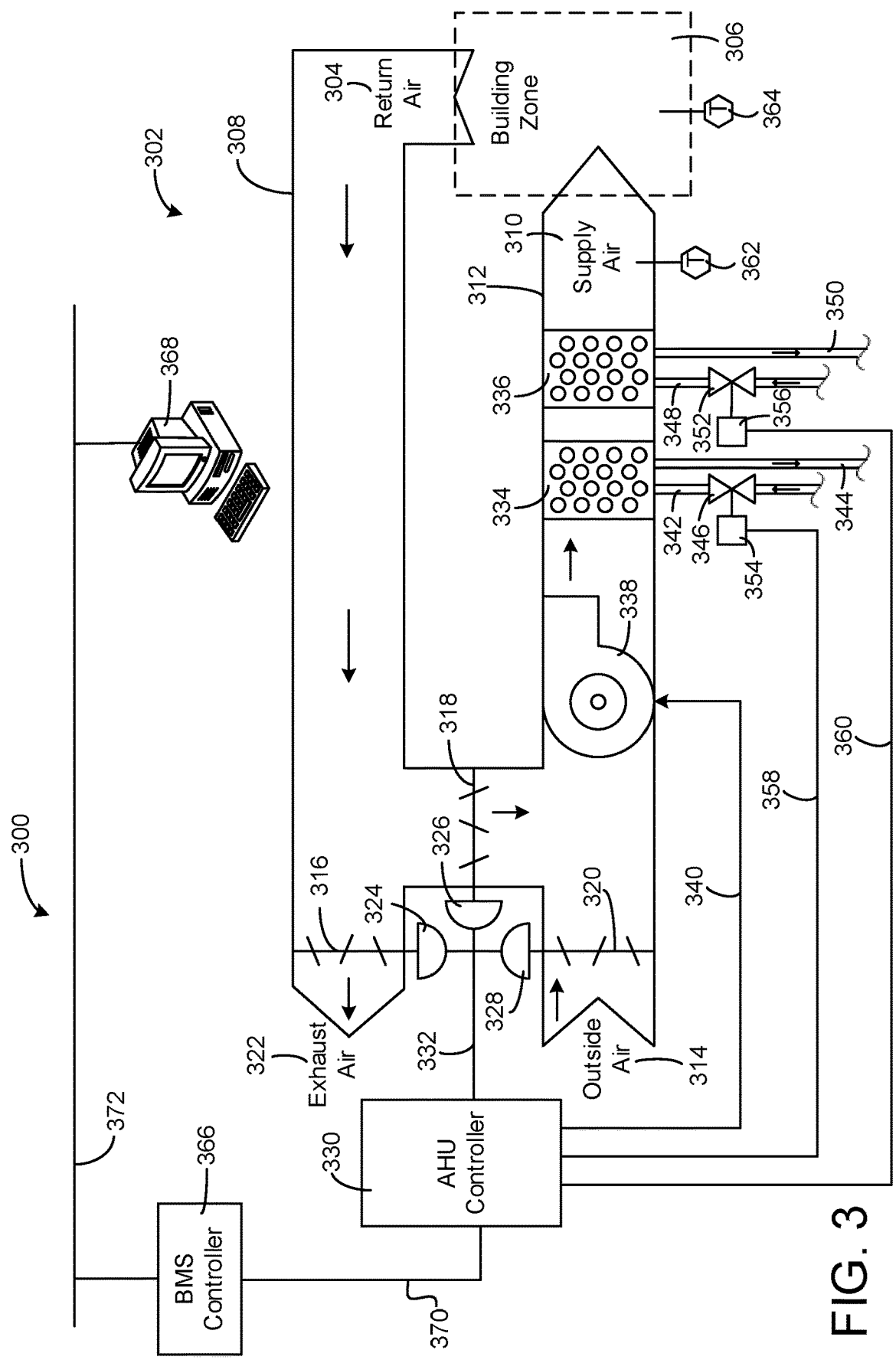
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
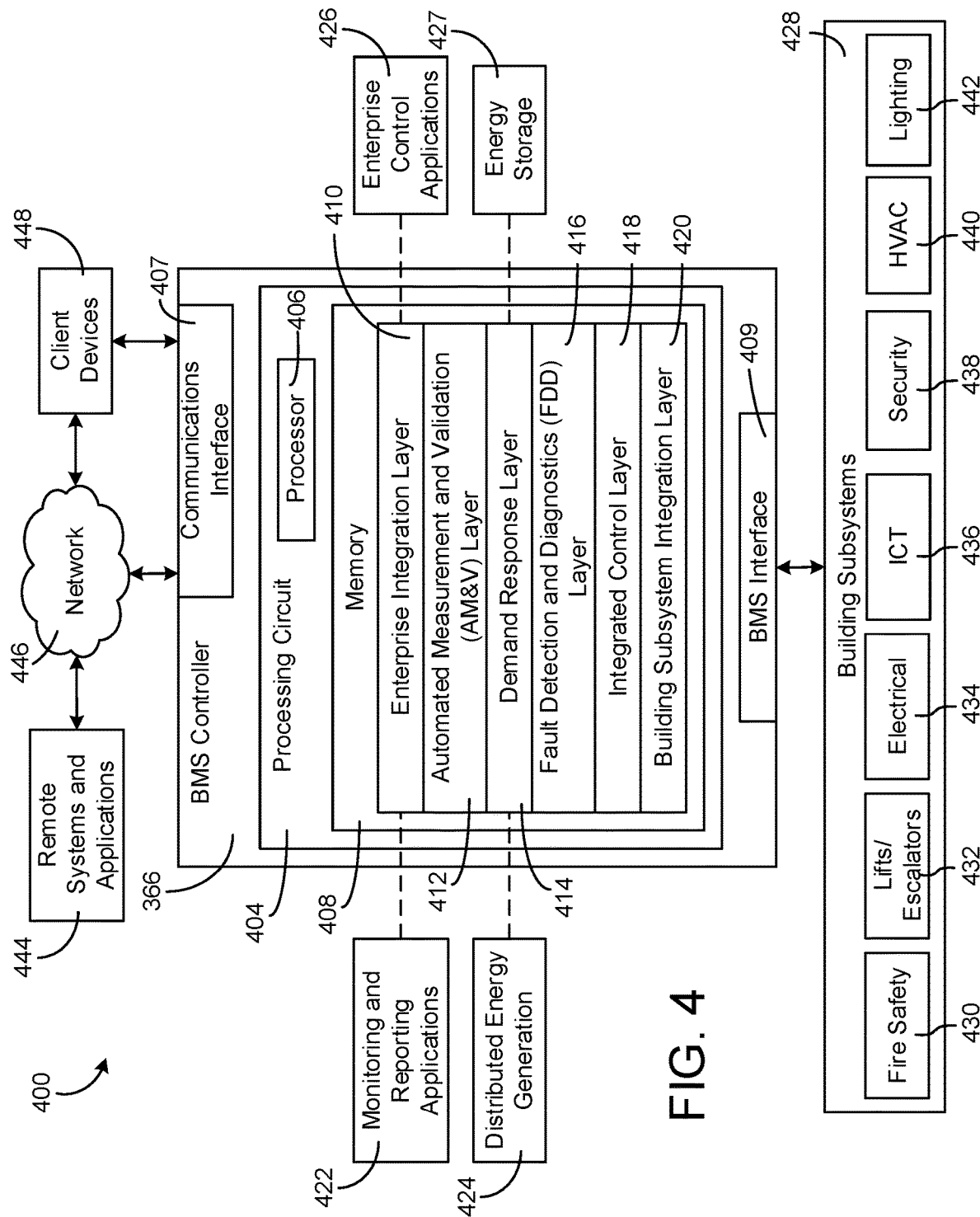
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BMS with Instant Feedback on Configuration

Figure 5:
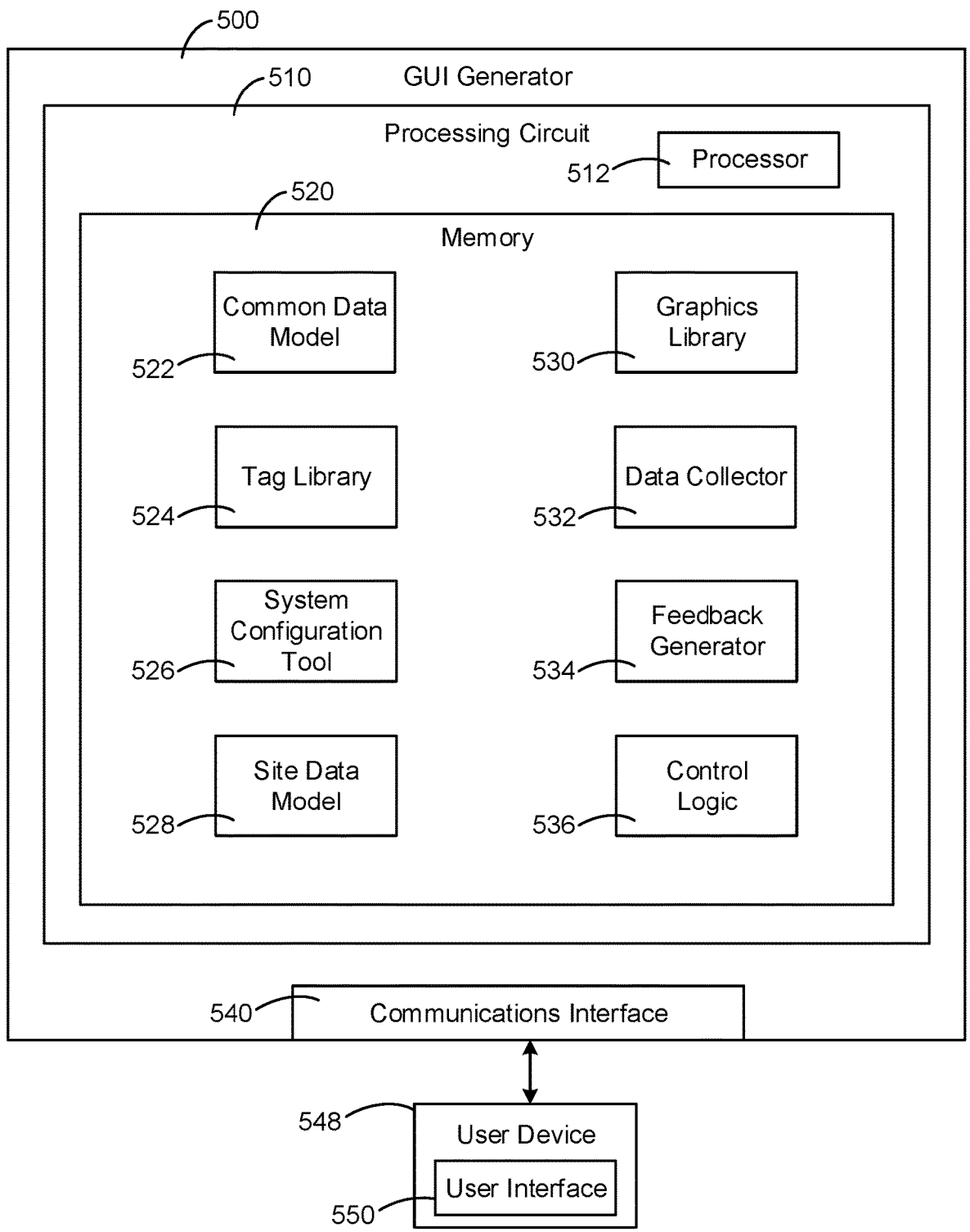
FIG. 5 is a block diagram of a graphical user interface (GUI) generator associated with the BMS of FIG. 4, according to some embodiments.

Referring now to FIG. 5, a GUI generator 500 is shown, according to some embodiments. GUI generator 500 can be implemented in a variety of ways, however GUI generator 500 is generally a component of BMS 400 that is configured to generate a user interface. For example, GUI generator 500 may be implemented via one or more servers that are either located in building 10 or located remotely (e.g., cloud servers). GUI generator 500 is shown to include a processing circuit 510 with a processor 512, a memory 520, and a communications interface 540. Also shown is a user device 548 on which a user interface 550 is presented such that a user can interact with BMS 400. User device 548 may be any type of device such as a workstation, personal computer, laptop, tablet, smartphone, etc. User device 548 and GUI generator 500 can communicate back and forth via communications interface 540. Communications interface 540 can use any communications protocol to establish this connection (e.g., Wi-Fi, LAN, WAN, etc.). Memory 520 is shown to include a plurality of components such as a common data model 522, a tag library 524, a system configuration tool 526, a site data model 528, a graphics library 530, a data collector 532, a feedback generator 534, and control logic 536. It is important to note that GUI generator 500 may include more, less, or different components than shown in FIG. 5.

Common data model 522 may be implemented in BMS 400 in order to define and analyze data requirements needed to support various business processes. Common data model 522 may, for example, define various object definitions, class definitions, and other data requirements associated with BMS 400. Common data model 522 can provide many benefits for users of BMS 400 generally related to leveraging large amounts of information to increase awareness, improve performance, and drive automation. For example, common data model 522 may allow managers, stakeholders, and other personnel to achieve a better understanding of system performance and data available through BMS 400 (e.g., through visualization, common nomenclature, etc.). Common data model 522 may also allow engineers, developers, and other technical personnel to better understand data organization and relationships within BMS 400. As a result, technical personnel may be able to create more effective logic (e.g., automate more processes) and build applications to more effectively leverage building automation data.

In some embodiments, common data model 522 defines a tag library 524 comprising a set of tags that may be applied to a variety of data structures in a BMS. For example, tags may be applied to building spaces (e.g., zones, floors), equipment, and points. Common data model 522 may define one or more requirements associated with each type of tag stored in tag library 524. For example, if a user applies an air handler tag to an air handler within BMS 400 (e.g., AHU 106), the user may be required to specify a discharge air temperature tag (e.g., a temperature sensor) associated with that air handler. In addition to the one or more requirements associated with each type of tag, users may have the ability to enter additional, non-required information associated with each tag. Further, relationships between tags stored in tag library 524 can be used in automatic zoning or grouping of equipment. For example, five fan coils may be configured to serve the same office space of a building. In this case, when a user makes a change to BMS settings (e.g., temperature change, set to occupied mode), GUI generator 500 may present an alert to the user via interface 550 suggesting that the change be applied to all five fan coils. The user may synchronize the change in settings across all five fan coils by selecting "OK" for example. This automatic zoning and grouping of equipment may then result in synchronized operation of all five coils. Tag library 524 can be used to build custom logic and applications within BMS 400.

In some embodiments, BMS 400 includes a system configuration tool 526 that may allow users or other personnel to perform commissioning activities and otherwise configure BMS 400. System configuration tool 526 may be presented to users through user interface 550, for example. Tool 526 may involve various layers of abstraction in order to present a more human-readable BMS interface for commissioning building systems. For example, tool 526 can allow personnel to create a model of a building space within BMS 400 without having a detailed understanding of low-level software and data structures that make the building model possible.

GUI generator 500 is also shown to include site data model 528. BMS 400 may be provided to a variety of customers for implementation at a variety of different building sites. Each site may have an associated data model 528 that includes most or all data associated with the building site. For example, a user can create a site model for a school using system configuration tool 526. Common data model 522 may be implemented across all sites in order to provide consistent configuration standards and data requirements for all users of the BMS. In some embodiments, site data model 528 is a model of building 10 and associated equipment.

GUI generator 500 is also shown to include a graphics library 530 that can be used to generate various equipment graphics and other graphics for presentation to a user via user interface 550. In some embodiments, graphics library 530 is related to tag library 524. For example, a graphic for an air handler may be stored in graphics library 530 and may be generated each time a user tags a new air handler. In addition, sub-equipment graphics (e.g., sensors, fans, filters) may be generated and displayed on the air handler graphic when a user tags such sub-equipment associated with the air handler. Graphics library 530 may contain building equipment graphics for chillers, boilers, ducts, lighting, fans, compressors, etc. Graphic generation and presentation to a user via user interface 550 can provide visual aids during system commissioning as well as visualization of data once a system has been configured.

GUI generator 500 is also shown to include a data collector 532 that can be configured to collect and present real-time data to a user of BMS 400 via user interface 550. Data collector 532 may collect data from a variety of points and equipment within a BMS. For example, data collector 532 can retrieve real-time readings from a temperature sensor, flow sensor, supply fan, lighting system, occupancy sensor, etc. In some embodiments, the data collected by data collector 532 is associated with one or more tags stored in tag library 524. Each tag may specify associated data to collect and a format to store and/or display data as defined by common data model 522.

GUI generator 500 is also shown to include a feedback generator 534 that can be configured to generate feedback for display to a user via user interface 550. Feedback generator 534 can be configured to leverage tag library 524, graphics library 530, and data collector 532 in order to generate various types of alerts, warnings, visual aids, error messages, and other feedback to assist users in properly configuring BMS 400. Common data model 522 can allow feedback generator 534 to determine a set of one or more requirements associated with each tag in a BMS. Feedback generator 534 can be configured to then check if each of the set of requirements has been properly specified by a user. If one or more requirements are missing, or a user has specified information incorrectly, feedback generator 534 can provide feedback to the user via user interface 550. In addition to warning or alerts, feedback generated may include visual indications (e.g., via equipment graphics) and real-time data (e.g., from data collector 532). For example, if a user selects a portion of a graphic, feedback generator 534 may be configured to display a list of requirements associated with the selected portion of the graphic and an indication of whether each requirement has been satisfied or not. As another example, real-time data may be displayed near a graphic for a sensor and may provide an indication of whether the sensor was configured properly (e.g., likely an error if a temperature sensor displays a reading of 1,000). As another example, referring back to FIG. 3, a user may accidentally tag zone temperature point 364 as a supply air temperature point (e.g., point 362). In this case, visual feedback may alert the user of the mistake since the equipment graphic presented via interface 550 may display a supply air temperature sensor instead of a zone air temperature sensor. Visual feedback may also alert users of mistakes when creating new equipment. For example, still referring back to FIG. 3, a user may wish to add a second exhaust fan (e.g., in addition to fan 338) but may only tag the fan command and status. In this case, the user may expect to see an exhaust fan equipment graphic presented via interface 550, but the graphic may not show up due to improper tagging. This feedback during or after configuration can allow for better performance of building automation as well as provide a better overall user experience.

GUI generator 500 is also shown to include control logic 536 that can be created using interface 550. For example, a user can create a control sequence for AHU 106 within BMS 400 in order to increase energy efficiency while still maintaining a comfortable environment within building 10 during occupied hours. For users that do not have a great deal of experience building control logic within BMS 400, the ability to receive feedback as produced by feedback generator 534 can be helpful to ensure that such users do not make any configuration mistakes. Control logic 536 may be created using logic symbols (e.g., functional blocks), ladder logic, and computer code among other methods of creating control logic. Controls logic 534 may also be created using standard control sequences and by using features built-in to BMS 400 (e.g., demand limiting and load rolling).

Figure 6:
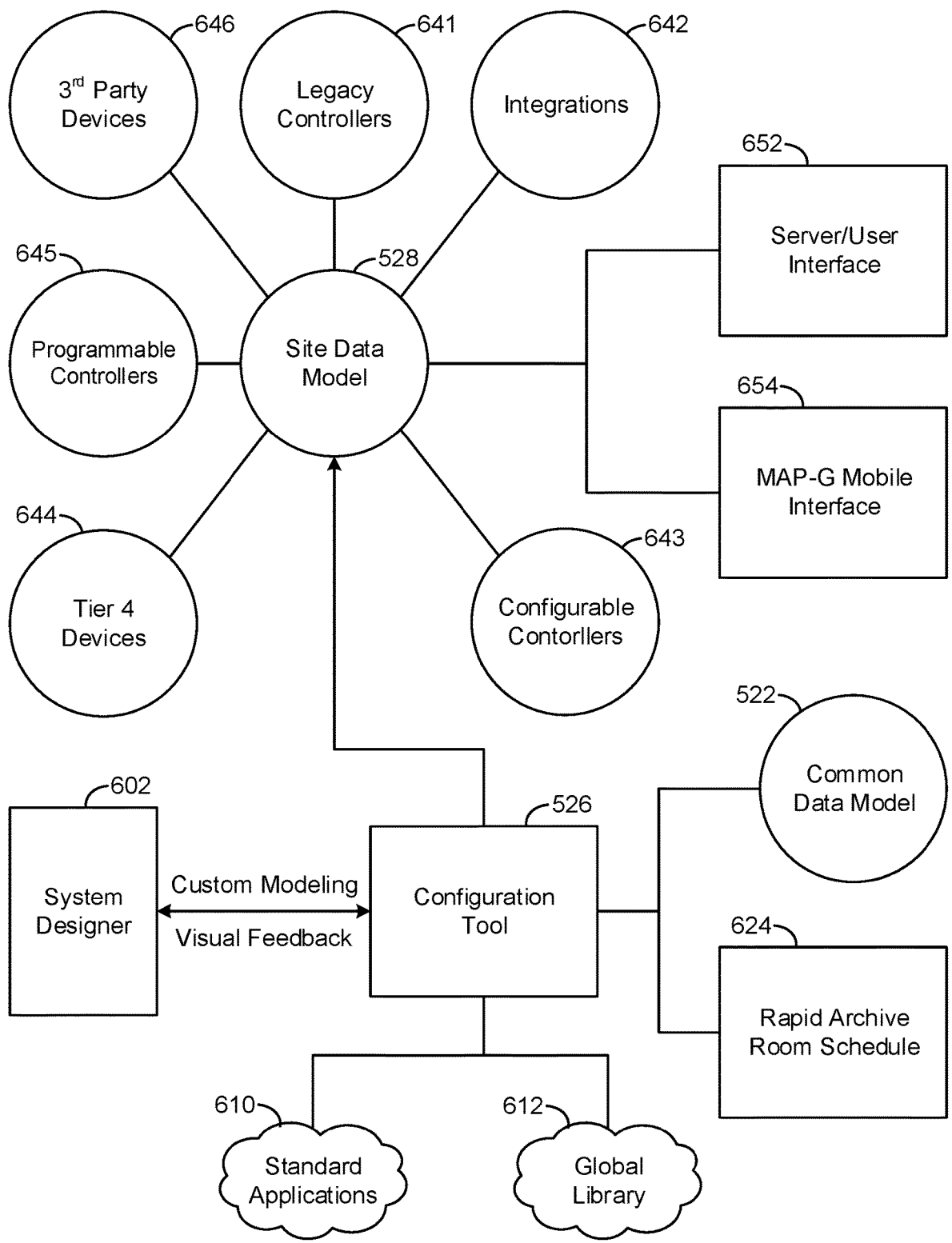
FIG. 6 is a block diagram showing various components of the BMS of FIG. 4, according to some embodiments.

Referring now to FIG. 6, an example block diagram showing various components of BMS 400 is shown, according to some embodiments. As shown, a system designer 602 (e.g., a user of BMS 400) interacts with configuration tool 526 (e.g., via interface 550) to perform custom modeling such as applying tags or building control logic. While performing this modeling, system designer receives visual feedback via interface 550. Configuration tool 526 is shown to leverage common data model 522, rapid archive and room scheduling 624, standard applications 610, and a global library 612. In some embodiments, rapid archive and room scheduling 624 is a feature of BMS 400 that allows system designer 602 to easily configure space and equipment relationships through interface 550. Moreover, rapid archive and room scheduling 624 may allow system designer 602 to configure archives within BMS 400 (e.g., using a spreadsheet). In some embodiments, standard applications 610 and global library 612 include various applications and features accessible to system designer 602 and contained on one or more remote servers (e.g., the cloud).

As shown in FIG. 6, configuration tool 526 can be used by system designer 602 to create site data model 528 for building 10. The site data model can include information about all types of devices installed in building 10 such as legacy controllers 641, integrations 642, configurable controllers 643, tier 4 devices 644, programmable controllers 645, and third party devices 646. Site data model 528 may also contain information related to building equipment and sensors connected to these controllers (e.g., HVAC equipment as described above). In some embodiments, data associated with site data model 528 is stored on an on-premises server 652 that is installed in building 10. However, data associated with site data model 528 can also be stored on one or more remote servers (e.g., cloud-based servers) or on one or more controllers such as BMS controller 366. GUI generator 500 can be implemented via server 652, for example. Site data model 528 can also be accessed using a portable device such as a portable gateway device 654 that present a user interface on a mobile device such as a smartphone.

Figure 7:
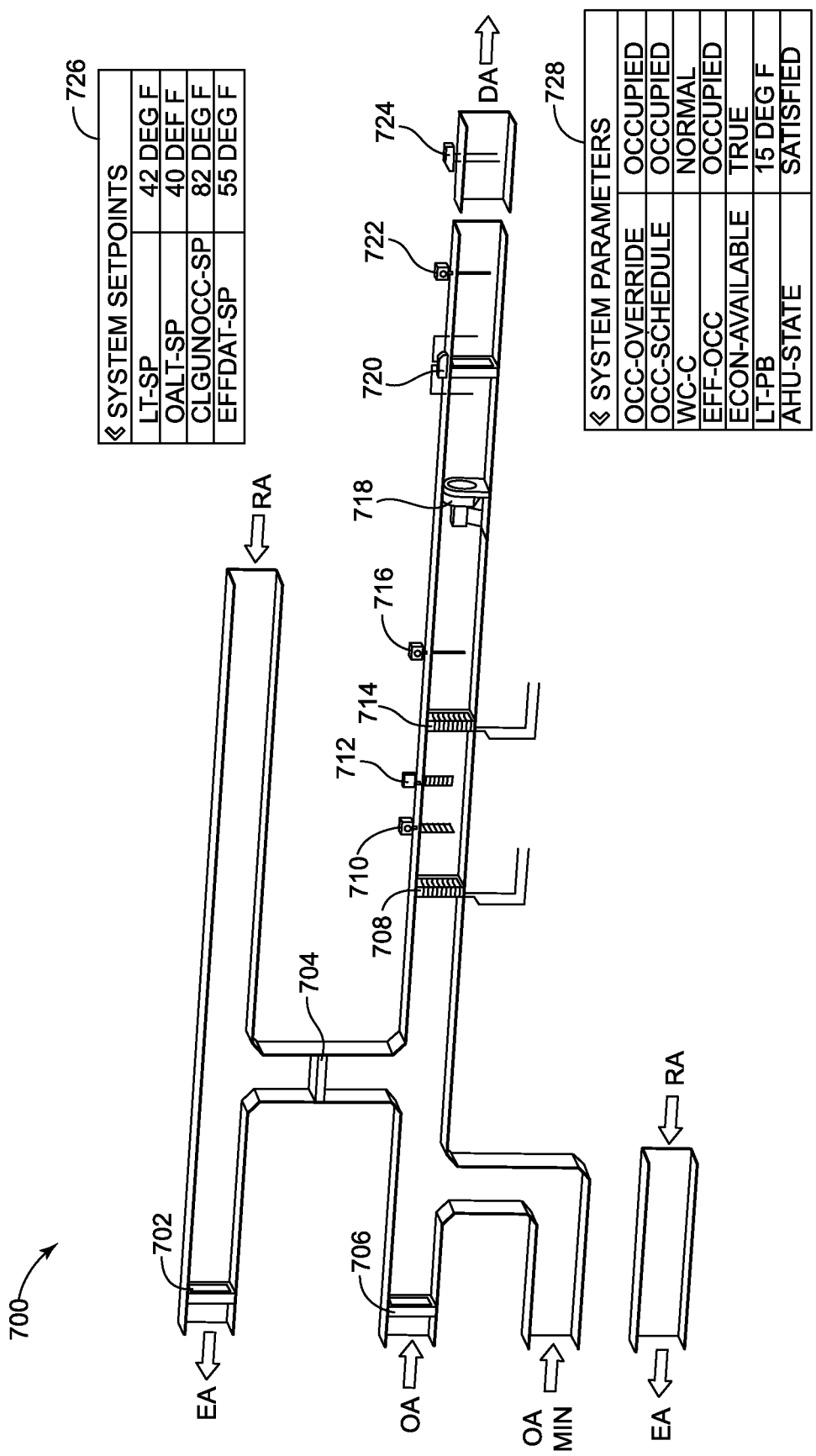
FIG. 7 is an illustration of an example of an equipment graphic that can be generated for presentation to a user by the GUI generator of FIG. 5, according to some embodiments.

Referring now to FIG. 7, an example equipment graphic 700 that can be generated by GUI generator 500 is shown, according to some embodiments. Graphic 700 depicts an air handling unit (e.g., AHU 106) along with associated setpoints 726, system parameters 728, and sub-equipment associated with the air handler. For example, graphic 700 is shown to include temperature sensors 710, 716, and 722 as well as a pressure sensor 712. Further, graphic 700 I shown to include a supply fan 718, an air filter 720, and a pressure switch 712. Graphic 700 is also shown to include a heating coil 708, a cooling coil 714, and dampers 702, 704, and 706. In some embodiments, the ductwork graphics associated with the air handler are generated when a user first tags the air handler. The graphic showing temperature sensor 722 for example, may then be generated after a user tags temperature sensor 722 as a discharge air temperature associated with the air handler. In some embodiments, tagging of supply fan 718 and air filter 720 satisfies one or more requirements associated with the creation of the air handler. Feedback may be generated and presented via graphic 700 if any of the required sub-equipment associated with the air handler is missing. For example, GUI generator 500 may be configured to highlight a portion of graphic 700 presented via interface 550 if a supply fan has not been properly tagged and associated with the air handler. In this case, interface 550 may also display an alert indicating that a supply fan needs to be tagged. In addition, a user may be able to select various parts of graphic 700 in order to see tag details and other information associated with the selection. Real-time data may also be shown on graphic 700 such as a temperature sensor reading (e.g., 72° F.). Feedback and visualization provided via graphic 700 may create a more user-friendly BMS experience.

Referring now to FIG. 8, two example point interfaces showing data points associated with BMS 400, according to some embodiments. The interfaces include a point list interface 800 and a point details interface 850 that may be generated by GUI generator 500 and presented via user interface 550, for example. Interface 800 shows a variety of data points such as a supply fan status point, a preheat temperature point, and a discharge air temperature point. Interface 850 shows some of the data that may be associated with the mixed air damper output point 802 shown in interface 800. For example, the mixed air damper point 802 may have a name and a description as shown in interface 850. Other information associated with mixed air damper output point 802 such as a hardware description (e.g., model number) and associated engineering values may also be maintained by BMS 400. In addition, interface 850 shows a plurality of tags 852 that have been applied by a user and associated mixed air damper point 802. For example, as shown, mixed air damper output point 802 has been tagged as an output of a specific air handler.

Referring now to FIG. 9, an example of textual feedback 900 that can be generated by GUI generator 500 is shown, according to some embodiments. Textual feedback 900 may be presented to a user of BMS 400 via interface 550. As shown in FIG. 9, a list of missing requirements is presented to the user. These missing requirements include a missing connection 902, a missing tag 904, and a missing equipment type and serving relationship 906. It is important to note that these missing requirements are examples and various types of textual feedback are contemplated to assist the user in properly configuring BMS 400.

Referring now to FIG. 10, an example textual summary 1000 of control logic that can be generated by GUI generator 500 is shown, according to some embodiments. Textual summary 1000 may be presented via user interface 550 in order to assist users in understanding logic created and implemented in a BMS (e.g., control logic 536). For example, a BMS can analyze logic created using tags and graphics and present a textual summary to the user via interface 550. Textual summary 1000 can provide a plain text description of logic configured in BMS 400 as an alternative to a logic diagram, for example. Textual summary 1000 can also provide instructions to a user (e.g., technician) for properly configuring building equipment. For example, textual summary 1000 describes a supply a speed control sequence and indicates that the purpose of the control sequence is to maintain a minimum static pressure within ductwork. Further, textual summary 1000 provides instructions to regarding a location to install a sensor and a location to obtain a measurement. The plain text description can then be compared to previous logic and/or desired logic (e.g., as defined by specifying engineer). Textual summaries such as summary 1000 may be provided for a variety of tags and logic within a BMS and may help technicians and other personnel properly configure a BMS.

Figure 11:
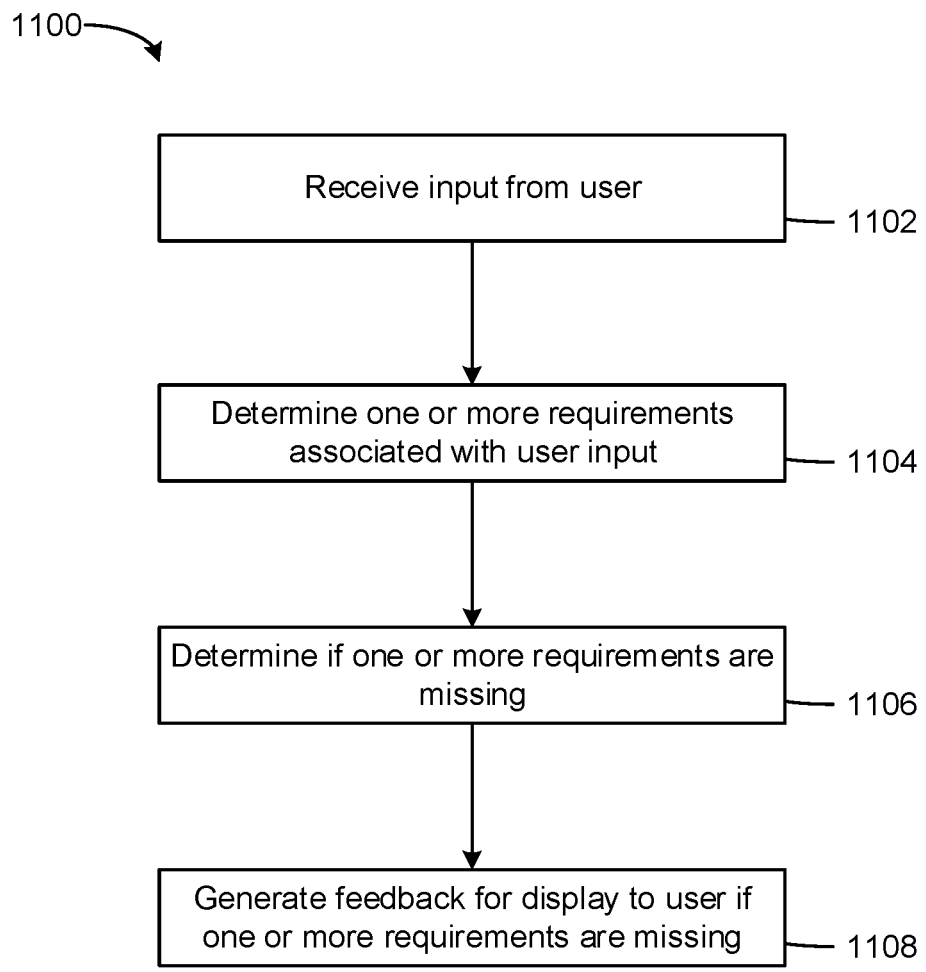
FIG. 11 is a flow diagram of a process for generating feedback to assist a user in configuring the BMS of FIG. 4, according to some embodiments.

Referring now to FIG. 11, a process 1100 for generating instant feedback on configuration of BMS 400 is shown, according to some embodiments. Process 1100 can be performed by various components of BMS 400 such as GUI generator 500. Process 1100 may result in more effective configuration of a BMS 400.

Process 1100 is shown to include receiving an input from a user (step 1102). The user input may be received via user interface 550, for example. In some embodiments, the user input is an application of a tag. However, other types of inputs are also contemplated. In some embodiments, system configuration tool 526 is used by a technician, building stakeholder, or other user to set up and configure BMS 400. The input received in step 1302 may result in the generation of new feedback, removal of feedback, or neither.

Process 1100 is also shown to include determining one or more requirements associated with the user input (step 1104). In some embodiments, step 1104 is performed by feedback generator 534. The one or more requirements associated with the user input may be defined by common data model 522. For example, if a user creates a new tag for an air handler, the user may be required to specify associated sensors, fans, air filters, and connections with other equipment. The one or more requirements associated with the input can help to ensure proper definition and association of data for improved performance of BMS 400. In some embodiments, step 1104 includes determining an error associated with the user input (e.g., incorrect application of a tag).

Process 1100 is also shown to include determining if one or more requirements are missing (step 1106). In some embodiments, step 1106 is performed by feedback generator 534. As an example, if a user tags an air handler but does not specify an associated discharge air temperature sensor, feedback generator 534 may determine that a requirement is missing. On the other hand, feedback generator 534 may also be configured to determine if the user input satisfied one or more previously missing requirements.

Process 1100 is also shown to include generating feedback for display to the user if one or more requirements are determined to be missing (step 1108). Feedback may also be generated in response to an error associated with the user input. In some embodiments, step 1108 is also performed by feedback generator 534. GUI generator 500 may provide the feedback to the user via user interface 550, for example. As mentioned above, feedback may be provided visually, graphically, as an alert, as a warning, or any other way of providing feedback via a user interface. If the user input was determined to satisfy one or more previously missing requirements in step 1106, step 1108 may then involve removing previously generated feedback and/or indicating that the previously generated feedback has been satisfied. The feedback generated in step 1108 can allow a variety of personnel such as technicians and system designers to more efficiently set up, maintain, and leverage a BMS.

While not shown in FIG. 11, it can be inferred that process 1100 may continue with additional steps. For example, after feedback has been presented to the user, the user may provide additional input in order to satisfy a missing requirement or fix an error associated with a previous input. Once configured properly, the user may then interact with BMS 400 through interface 550 in order to establish make a control decision associated with building equipment. For example, the user may configure a schedule for an air handler (e.g., AHU 106) such that BMS controller 366 causes the air handler to shutdown overnight to save energy.

Figure 12:
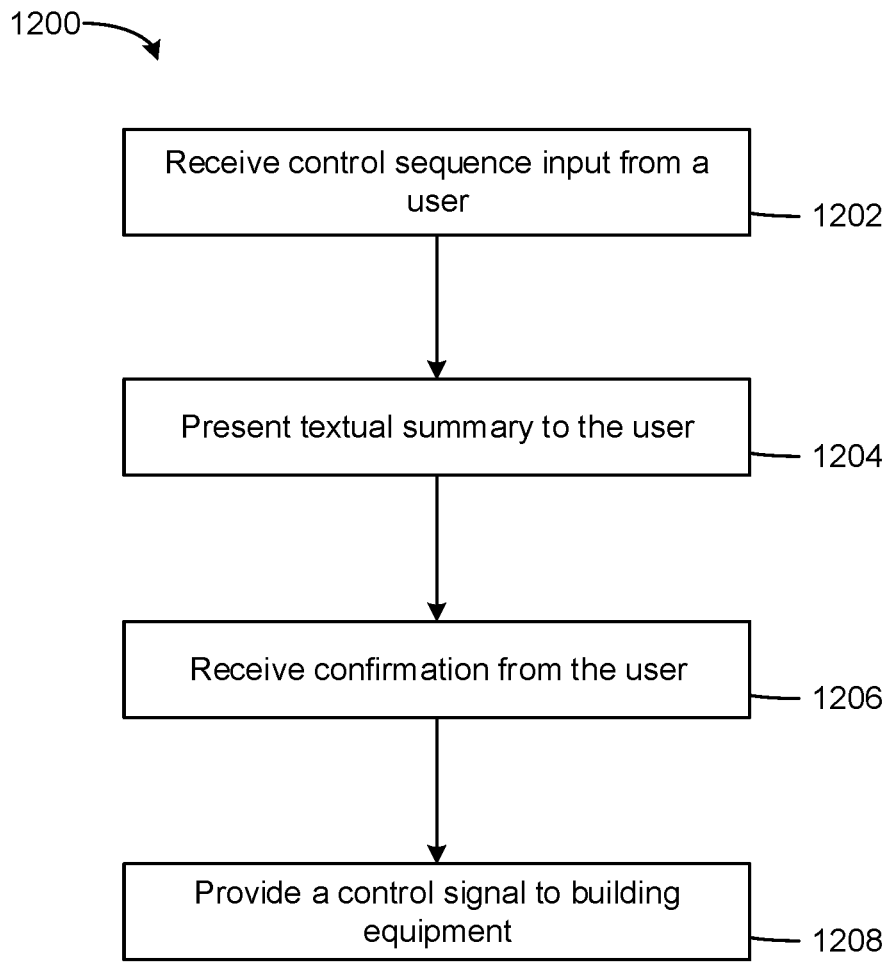
FIG. 12 is a flow diagram of another process for generating feedback to assist a user in configuring the BMS of FIG. 4, according to some embodiments.

Referring now to FIG. 12, another process 1200 for generating instant feedback on configuration of BMS 400 is shown, according to some embodiments. Similar to process 1100, process 1200 can be performed by various components of BMS 400 such as GUI generator 500 and may result in more effective configuration of a BMS 400.

Process 1200 is shown to include receiving a control sequence input from a user (step 1202). The user input may be received via user interface 550. For example, the control sequence may be a supply fan speed control sequence. Depending on the user, there may be uncertainty regarding whether the control sequence has been properly configured within BMS 400 as well as regarding whether building equipment associated with the control sequence is properly configured.

Process 1200 is also shown to include providing a textual summary of the control sequence to the user (step 1204). In some embodiments, step 1204 is performed by feedback generator 534. The textual summary may be similar to textual summary 1000, for example. The textual summary generally provides an easily digestible description of what the control sequence does as well as any steps that need to be performed related to configuring building equipment. This functionality provides increased efficiency when configuring BMS 400.

Process 1200 is also shown to include receiving confirmation of the control sequence from the user (step 1206). For example, after the user has read the textual summary presented in step 1204, the user may perform an action (e.g., selecting a "confirm" button or an "OK" button) via user interface 550 to confirm the control sequence is configured as the user intended. In some cases, the user may think the control sequence is configured properly, however after reading textual summary 1000 the user may realize a mistake was made. Once the control sequence is confirmed, it can be executed (e.g., automated) within BMS 400.

Process 1200 is also shown to include providing a control signal to building equipment (step 1208). Once the control sequence is confirmed by the user, BMS 400 may execute the control logic and provide a control signal to building equipment for operation in accordance with the control sequence.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for configuring and operating building equipment in a building management system (BMS), the method comprising:
   receiving a first input from a user via a user interface, the first input comprising an application of a tag within the BMS, wherein the tag is associated with at least one of a type and a relationship with the building equipment within a building;
   presenting an equipment graphic on the user interface in accordance with the application of the tag;
   identifying one or more requirements associated with the first input;
   providing feedback for display if one or more of the one or more requirements are missing; and
   providing a third input from the user via the user interface, the third input comprising data that satisfies the missing requirement.

2. The method of claim 1, wherein the tag comprises one or more requirements defined by a model.

3. The method of claim 1, wherein presenting the feedback to the user comprises presenting textual feedback on the user interface.

4. The method of claim 1, wherein identifying the missing requirement comprises identifying a sensor that needs to be associated with an air handling unit.

5. The method of claim 1, wherein identifying the missing requirement comprises determining that a building space served by an air handling unit needs to be identified.

6. The method of claim 1, wherein identifying the missing requirement comprises identifying a sensor that needs to be associated with a chiller.

7. The method of claim 1, wherein the the missing requirement comprises a first required input, the method further comprising:
   identifying a second required input associated with the first input; and
   presenting a list of required inputs to the user on the user interface, the list comprising the first required input and the second required input.

8. A building management system (BMS) comprising one or more computer-readable storage media having instructions stored thereon that, when executed by one or more processors, cause the one or more processors to implement operations comprising:
   receiving a first input from a user via a user interface, the first input comprising an application of a tag within the BMS, the tag being associated with at least one of a type and a relationship with building equipment within a building;
   presenting an equipment graphic on the user interface in accordance with the application of the tag;
   identifying one or more requirements associated with the first input;
   providing feedback for display if one or more of the one or more requirements are missing; and
   providing a third input from the user via the user interface, the third input comprising data that satisfies the missing requirement.

9. The system of claim 8, wherein presenting the feedback comprises presenting at least one of graphical feedback or textual feedback on the user interface.

10. The system of claim 8, wherein identifying the missing requirement comprises identifying at least one of a sensor that needs to be associated with an air handling unit or a building space that needs to be designated as served by the air handling unit.

11. The system of claim 8, wherein identifying the missing requirement comprises identifying a sensor that needs to be associated with a chiller.

12. The system of claim 8, wherein presenting the feedback to the user via the user interface comprises presenting the feedback to the user on a display of a user device, the user device comprising at least one of a smartphone, a tablet, or a laptop.

13. The system of claim 8, further comprising:
   providing a control decision to the building equipment comprises providing a setpoint to the building equipment.

14. The system of claim 8, wherein the missing requirement comprises a first required input, the operations further comprising:
   identifying a second required input associated with the first input; and
   presenting a list of missing required inputs to the user on the user interface, the list comprising the first required input and the second required input.

15. The system of claim 14, wherein the building equipment comprises an air handling unit, the first required input comprises a sensor associated with the air handling unit, and the second required input comprises a building space served by the air handling unit.

16. A method for configuring and operating building equipment in a building management system (BMS), the method comprising:
- receiving a first input from a user via a user interface, the first input comprising an application of a tag within the BMS, wherein (i) the tag comprises one or more requirements defined by a model, the model configured to define a plurality of object definitions, and (ii) the tag is associated with at least one of a type and a relationship associated with the building equipment within a building;
- presenting an equipment graphic on the user interface in accordance with the application of the tag;
- identifying one or more requirements associated with the first input;
- providing feedback for display if one or more of the one or more requirements are missing; and
- providing a third input from the user via the user interface, the third input comprising data that satisfies the missing requirement.

17. The method of claim 16, wherein receiving the first input comprises receiving a supply fan speed control sequence.

18. The method of claim 17, wherein presenting the equipment graphic comprises presenting a description of the application of the tag comprising an indication that the supply fan speed control sequence is used to maintain a minimum static pressure within ductwork.

19. The method of claim 18, wherein presenting the description comprises providing a location for installing a sensor.

20. The method of claim 18, wherein presenting the description comprises providing a location for obtaining a measurement.

* * * * *